March 6, 1956  G. R. BAYLEY  2,737,254
POWER OPERATED HOOD MECHANISM
Filed July 25, 1952  2 Sheets-Sheet 1
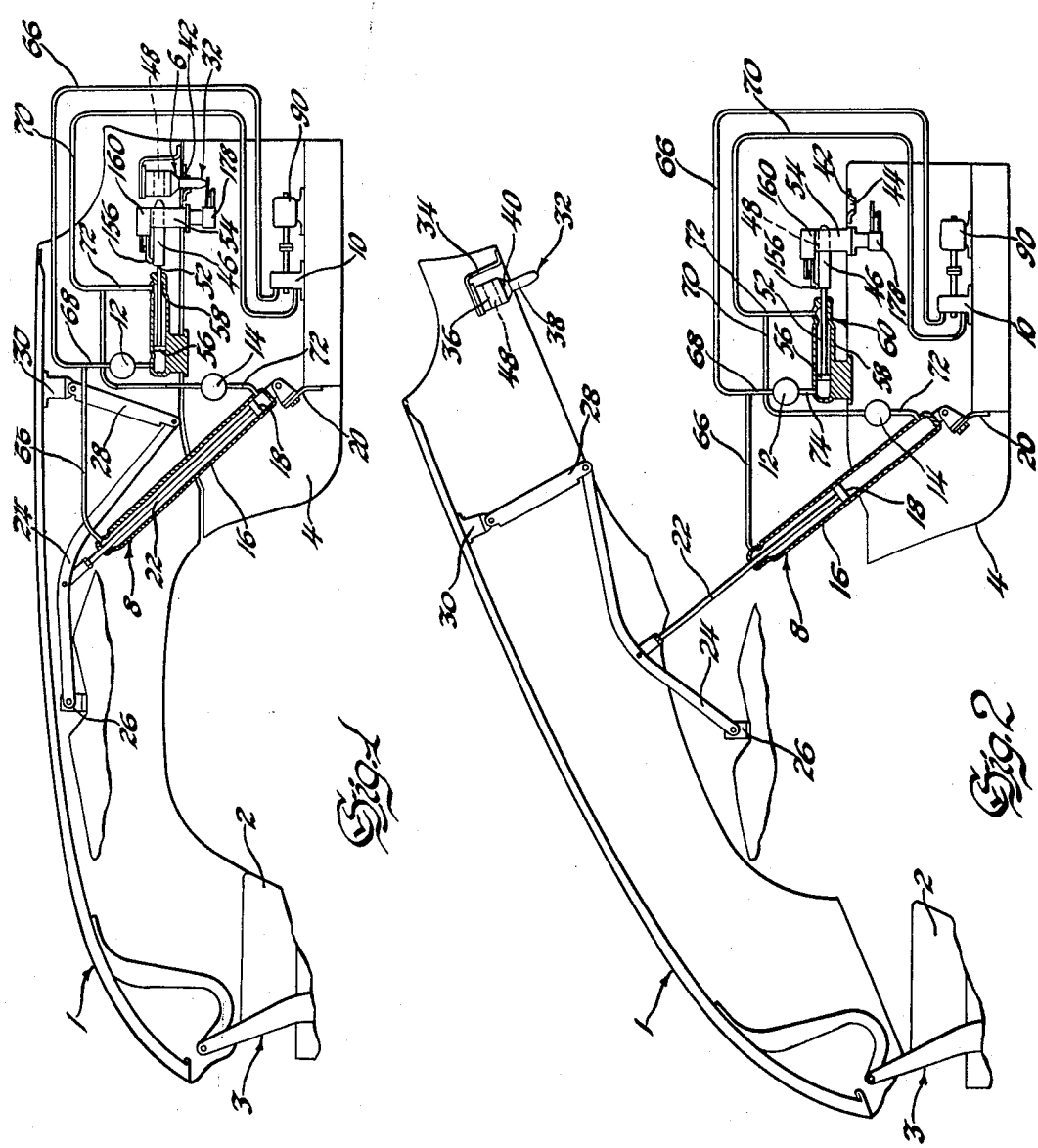
Inventor
George R. Bayley
By Willis, Helmig & Baillio
Attorneys

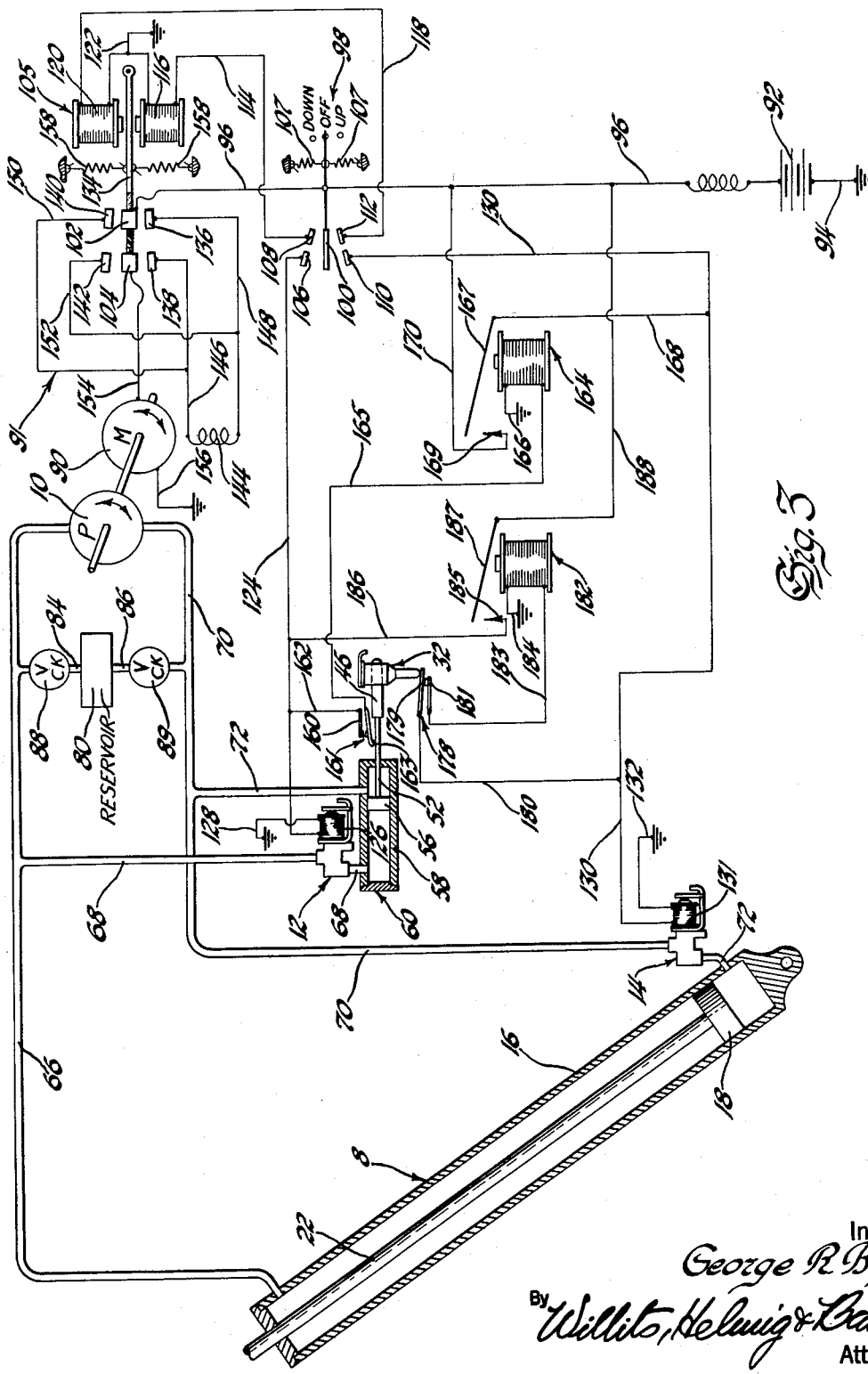

2,737,254
POWER OPERATED HOOD MECHANISM

George R. Bayley, Flint, Mich., assignor to General Motors Corporation, Detroit, Mich., a corporation of Delaware Application July 25, 1952, Serial No. 300,999

2 Claims. (Cl. 180—69)

The present invention relates to hood operating means and, more particularly, to power means for raising and lowering an automobile hood.

One trend in the styling of automotive vehicles is to so design the hoods thereof that they encompass substantially the entire front end of said vehicles. Raising and lowering of such automobile hoods not only requires considerable physical effort but because of the size therefor they also become unwieldy.

One object of the present invention is to provide a highly improved means for raising and lowering the movable hood structure of an automotive vehicle.

Another object is to provide means for properly aligning the hood structure when it is in the fully closed position.

A further object is to provide novel locking means for insuring that the hood structure will be locked when in its fully closed position.

A still further object is to provide a motor means of raising and lowering a vehicle hood and for locking the latter in closed position and control systems operatively associated therewith.

Other and further objects will become apparent as the description of the invention progresses.

Of the drawings:

Fig. 1 is a diagrammatic elevational view, partly in section, of the hood structure and the operating means therefor comprising the present invention said view showing the arrangement of the parts when the hood is in its lowered or closed position.

Fig. 2 is a view similar to Fig. 1 but showing the hood in partially open position, and Fig. 3 is a diagrammatic view of the electrical and hydraulic system for controlling the operation of the hood.

Referring to the drawings in more detail, the numeral 1 designates generally a movable hood structure for an automotive vehicle. The hood 1 is pivotally mounted at the front end thereof on the body structure 2 of a vehicle by means of a hinge structure 3. Hinge 3 may be of any suitable construction such as the gooseneck type shown in Figs. 1 and 2. When closed the rear portion of the hood is supported on the upper edges of the stationary fender panels 4 of the body structure 2 and is secured in that position by a latching mechanism 6. Although any suitable means may be utilized for operating the hood, a reciprocating fluid motor mechanism indicated generally at 8 has been found to be preferable. The fluid pressure for the fluid motor mechanism is supplied by a pump 10 and is controlled by a central mechanism hereinafter described including a pair of solenoid operated valves 12 and 14.

If desired, a fluid motor mechanism 8 may be provided at both sides of the vehicle and both controlled for simultaneous operation by the same control means to be presently described. Only one fluid motor mechanism 8, however, is shown in the embodiment illustrated. Fluid motor 8 comprises a cylinder 16 having a piston 18 mounted for reciprocation therein. One end of cylinder 16 is pivotally supported on a bracket 20 secured to the body 2 of the vehicle. A piston rod 22 is secured at one end to piston 18, the other end being pivotally attached to a curved link 24 intermediate the ends of the latter. One end of link 24 is pivotally attached to a bracket 26 secured to the vehicle body 2. The other end of link 24 is pivotally attached to the lower end of a relatively short second link 28, the upper end of which being pivotally attached to a bracket 30 secured to and depending from hood 1. It, therefore, is apparent that upon actuation of piston 18 outwardly, link 24 will swing about its pivotal connection on bracket 26 to thereby actuate hood 1 to its upper position of adjustment. If desired, the outer end of piston rod 22 may be pivotally connected directly to hood 1, the connection thereof to the linkage 24 and 28, however, as shown herein, being preferable.

The latch mechanism 6 for securing the hood 1 in closed position includes a downwardly projecting pilot pin or keeper 32 mounted on a bracket 34 secured to and depending from said hood near the rearwardly disposed end thereof. The pilot pin 32 has formed thereon an enlarged head 36, a tapered end portion 38 of smaller diameter and a conical seat portion 40 disposed at the junction of said tapered end and head portions. When the hood is closed the end portion 38 passes through a socket or aperture provided in a guide bracket 42 secured to the body 2 of the vehicle. The portion of bracket 42 around the socket is tapered as shown at 44 and cooperates with the generally tapered contour of the pilot pin 32 to compensate for any misalignment of the hood structure 1. When the hood is fully closed the conical seat 40 on the pin 32 will rest on the tapered portion 44 of the socket, and the hood will then be properly aligned with the adjoining body panels 4.

The hood 1 is locked in closed position by means of a latch bolt 46 which is adapted to enter a transverse opening 48 provided in the head portion 36 of pilot pin 32. The latch bolt 46 is secured to one end of a piston rod 52 and is guided for movement in a bearing opening provided in a supporting member 54 secured in any suitable manner to the vehicle body 2. The other end of piston rod 52 is secured to a piston 56 which operates in the cylinder 58 of a double-acting reciprocating motor 60 secured in any suitable manner to the body structure 2 of the vehicle. It is apparent that the hood 1 may be locked by bolt 46 only when it is in its fully lowered or closed position of adjustment. When in any other position the bolt 46 obviously is out of alignment with the opening 48 in keeper pin 32.

Pump 10 supplies fluid pressure for fluid motors 8 and 60 and may be of any suitable construction and forms part of a closed fluid system. As shown in Fig. 3, one side of pump 10 is connected to the piston rod end of the cylinder 16 of motor 8 by a pipe 66 and by a branch pipe 68 to the head end of the cylinder 58 of fluid motor 60. The other side of pump 10 is connected by a pipe 70 to the head end of cylinder 16 of motor 8 and by a branch pipe 72 to the piston rod end of the cylinder 58 of motor 60. The solenoid operated control valves 12 and 14 are mounted in pipes 68 and 70 respectively. A reservoir 80 is connected to pipes 66 and 70 by pipes 84 and 86 respectively and contains make-up fluid and also compensates for the difference in volume between the head and piston rod ends of motors 8 and 60. Check valves 88 and 89 are placed in pipes 84 and 86, respectively, which close to prevent the flow of fluid from said pipes into the reservoir 80 when either of said pipes is subjected to pressure by pump 10 but which open when subjected to suction to compensate for the difference between the head and piston rod ends of fluid motors 8 and 60. Reservoir 80 also supplies make-up fluid to compensate for any leakage in the system.

The pump 10 may be driven by any suitable reversible electric motor 90 connected in an electric circuit indicated generally at 91. Electric circuit 91 is energized by a battery 92 having one side connected to ground by a conductor 94 and the other side connected by a conductor 96 to movable contacts 100, 102 and 104 of the control switch 98 and the relay switch 105, respectively. The control switch 98 is manually operable and is normally held in open position by a pair of centering springs 107. Switch 98 has two sets of stationary contacts 106 and 108 and 110 and 112 which may be selectively engaged by the movable contact 100. The upper contact 108 is connected to one end of a conductor 114 the other end being attached to one side of the coil 116 of relay switch 105. The lower contact 112 of switch 98 has connected thereto a conductor 118 which leads to one side of a second relay coil 120 of switch 105. The opposite ends of coils 116 and 120 are connected to ground by a conductor 122. The upper contact 106 of control switch 98 has connected thereto a conductor 124 which leads to one side of the solenoid 126 for actuating valve 12. The other side of the solenoid 126 is connected to ground by a conductor 128. The lower contact 110 of control switch 98 has connected thereto a conductor 130 which leads to the coil of the solenoid 131 for actuating valve 14, the other side of said coil being connected to ground by a conductor 132.

When the coil 116 of relay switch 105 is energized the armature 134 moves downwardly thereby bringing movable contacts 102 and 104 into engagement with the lower stationary contacts 136 and 138, respectively, of said switch. When on the other hand the coil 120 of relay switch 105 is energized the armature 134 is moved upwardly thereby bringing movable contacts 102 and 104 into engagement with the upper stationary contacts 140 and 142 of said switch. The opposite ends of the field coil 144 of motor 90 are connected to lower stationary contacts 136 and 138, respectively, of switch 105 and conductors 146 and 148. The upper stationary contacts 140 and 142 of switch 105 are connected to conductors 146 and 148, respectively, by branch conductors 150 and 152. The movable contact 104 on armature 134 has attached thereto conductor 154 which leads to one side of the armature of motor 90, the other side thereof being connected to ground by a conductor 156. A pair of centering springs 158 attached to the opposite sides of the armature 134 normally retain the contacts 102 and 104 in open position and out of contact with both sets of stationary contacts of switch 105. Conductor 124 is connected to the stationary pole 160 of a latch control switch 161 by a conductor 162. The movable contact 163 of switch 161 is biased to open position but is adapted to be engaged by latch bolt 46 and to be actuated thereby into engagement with stationary contact 160 when the said bolt is retracted from locking engagement with pin 32. Movable contact 163 is connected to one end of the coil of a relay switch 164 by a conductor 165, the other end of said coil being connected to ground by a conductor 166. The movable contact 167 of switch 164 is connected to conductor 130 by a conductor 168 and the fixed contact 169 thereof is connected to conductor 96 by a conductor 170. Switch 164 is biased to open position and is closed upon closing of latch switch 161 and remains closed until the said switch 161 is opened. The locking switch 178 is mounted in any suitable manner on the supporting member 54 so that the pilot pin 32 will engage and move it to closed position when the hood is in the fully closed position. The movable contact arm 179 of switch 178 is connected to conductor 130 by a branch conductor 180. The fixed contact 181 of switch 178 is connected to one end of the coil of a relay switch 182 by a conductor 183, the other end of said coil being connected to ground by a conductor 184. The fixed contact 185 of switch 182 is connected to conductor 124 by a conductor 186 while the movable contact 187 is connected to conductor 96 by a conductor 188. Relay switch 182 is normally closed but is immediately opened upon opening of switch 178 when the hood is moved upwardly from its lowered position.

In order to correlate the various elements just described, a brief resume of the operation of the device will now be given. Assuming that the hood is locked in closed position and that it is desired to actuate it to raised position, the operator simply moves the control switch 98 to the position marked "Up." Upon this movement of switch 98 the movable contact 100 engages the upper stationary contacts 106 and 108 thereby closing the circuit to battery 92 and causing current to flow from said battery through conductor 96, movable contact 100 of switch 98 and through the solenoid 126 and coil 116 of relay switch 105, respectively, through conductors 124 and 114. When coil 116 is thus energized, the armature 134 will be pulled downwardly causing the movable contacts 102 and 104 to engage stationary contacts 136 and 138. Since the wire 96 leading from battery 92 is also connected to contact 102 of relay switch 105 current will also flow through contacts 102 and 136, conductor 148, field coil 144 of electric motor 90 and thence through conductor 146 to stationary contact 138. From contact 138 current flows to contact 104, wire 154 and through the armature of motor 90 and thence to ground. Motor 90 now drives the pump 10 in such a manner as to deliver pressure to pipe 70 and suction to pipe 66. When switch 98 is actuated to the "Up" position it will be remembered that the coil of solenoid 126 is energized causing the latter to actuate valve 12 to open position. Fluid from pump 10 now flows to the piston rod end of fluid motor 60 through pipes 70 and 72, and the fluid in the head end of said motor returns to said pump through pipe 68, valve 12 and pipe 66. Piston 56 of fluid motor 60 now moves to the left thereby withdrawing bolt 46 from pin 32 and thus releasing hood 1 for upward movement. When bolt 46 is in its locking position switches 160 and 164 are open and consequently the coil of solenoid 131 is not energized at this time. Valve 14 therefore is retained in closed position by the associated spring and therefore no fluid enters motor 8 from pipe 70. However, when bolt 46 is retracted to release the hood for movement, switch 160 is closed by movement of said bolt thereby completing the circuit to relay switch 164 causing closing of the latter and thereby closing the circuit to the coil of solenoid 131 whereupon the latter actuates valve 14 to open position. Fluid under pressure may now enter the lower end of the cylinder 16 of motor 8 causing the piston 18 to actuate the hood to open position. When the hood has been raised sufficiently the operator release switch 98 and the movable contact 100 thereof then moves to a mid position by centering springs 107. Upon deenergization of the coil of solenoid 131, the associated spring moves valve 14 to closed position. Piston 18 of motor 8 and consequently the hood now remain in adjusted position by the hydraulic lock created between said piston and valve 14.

When it is desired to lower the hood the switch 98 is moved to the "Down" position causing contact 100 to engage contacts 110 and 112. Coil 120 of relay switch 105 and the solenoid 131 will now be simultaneously energized. Upon energization of coil 120, armature 134 is moved upwardly bringing contacts 102 and 104 into engagement with contacts 140 and 142. When this occurs current will flow from conductor 96 through contacts 102 and 140 to conductor 150 which leads to conductor 146, thence through field coil 144 in a reverse direction from that previously described and thence through conductors 148 and 152 to contacts 142 and 104, and thence through conductor 154 and the armature of motor 90 and thence to ground. Since the current is flowing in a reverse direction through field 144, motor 90 will operate pump 10 in the opposite direction from that previously described thus causing the latter to deliver fluid under pressure to pipe 66 and suction to pipe 70. Since valve 14 is open the flow of fluid into the upper end of cylinder 16 of fluid motor 8 will actuate the piston 18 downwardly to lower the hood. The fluid in the lower end of cylinder 16 will now flow through valve 14 and pipe 70 to the pump 10. The surplus of fluid due to the difference in volume between the head end and piston rod end of the cylinder will flow into the reservoir 80 through valve 89. When the hood is fully closed the pilot pin 32 will engage the switch 178 and move it to closed position. Current will now flow from the energized conductor 130 through conductor 180, switch 178, conductor 183 to the coil of relay switch 182 causing the movable contact 187 to engage fixed contact 185. Current will now flow from battery wire 96 through the conductor 188, switch 182, conductors 186 and 124 to the coil of solenoid 126 causing movement of valve 12 to open position. When valve 12 is open, fluid under pressure will enter the head end of cylinder 58 of fluid motor 60 causing the piston 56 and bolt 46 to move to the right. The end of bolt now passes through the opening in pin 32 and consequently the hood is now locked in closed position. When the hood is fully down and locked the operator releases the switch 98 so that the spring 107 will return the switch to the "Off" position, whereupon the hood will remain in the fully closed and locked position.

While only one embodiment of the invention has been disclosed herein, it will be apparent to those skilled in the art that the invention may be embodied in other forms without departing from the true spirit thereof. It, therefore, is to be understood that it is not intended to limit the invention to the specific embodiment disclosed, but only by the scope of the claims which follow.

What is claimed is:

1. In an automobile having a hood structure movable between an opened and closed position, the combination of hood moving means and a control mechanism connected to said hood moving means for controlling the operation thereof, said hood moving means including a hydraulic pump, a hood raising cylinder hydraulically connected to said pump and having a piston rod connected to said hood for moving said hood between said opened and closed positions, a locking cylinder having a retractable and extensible bolt for fitting into an aperture in said hood structure when said hood is in the fully closed position, said control mechanism including a separate solenoid actuated valve for each of said cylinders for controlling the flow of fluid into said cylinders and a separate switch for each of said valves, one of said switches being positioned to engage said bolt when it is in the extended position, said switch being connected to the solenoid for the valve controlling said hood raising cylinder to prevent the flow of fluid into said last mentioned cylinder when said bolt is extended, the other of said switches being positioned to engage said hood structure when it is in the closed position, said last mentioned switch being operatively connected to the solenoid for the valve for said locking cylinder to prevent the flow of fluid thereinto when said hood is out of said closed position.

2. In an automobile having a hood structure movable between an opened and closed position, the combination of hood moving means and a control mechanism connected to said hood moving means for controlling the operation thereof, said hood moving means including an hydraulic pump, a hood raising cylinder hydraulically connected to said pump and having a piston rod connected to said hood for moving said hood between said opened and closed positions, a locking cylinder connected to said hydraulic pump in parallel with said hood raising cylinder, said last mentioned cylinder including a piston rod having a retractable and extensible bolt for fitting into an aperture in said hood structure when said hood is in the fully closed position for locking said hood in said position, said control means comprising a first solenoid actuated valve connected to said hood raising cylinder for controlling the flow of fluid into said hood raising cylinder and a second solenoid actuated valve connected to said locking cylinder to control the flow of fluid into said locking cylinder, a switch operatively connected to said first solenoid and being positioned to engage said bolt when it is in the extended position for closing said first mentioned valve to prevent the flow of fluid into said hood raising cylinder when said bolt is extended, and a second switch connected to said second solenoid and being positioned to engage said hood when in the closed position and said second switch being connected to said second solenoid for closing said second valve to prevent the flow of fluid into said locking cylinder when said hood is out of said closed position.

References Cited in the file of this patent

UNITED STATES PATENTS

| | | |
|---|---|---|
| 1,948,951 | Walker | Feb. 27, 1934 |
| 2,130,618 | Gnavi | Sept. 20, 1938 |
| 2,197,648 | Mersheimer | Apr. 16, 1940 |
| 2,200,346 | Sepull | May 14, 1940 |
| 2,535,600 | Rappl | Dec. 26, 1950 |
| 2,569,218 | Bailey | Sept. 25, 1951 |
| 2,622,400 | Greer | Dec. 23, 1952 |
| 2,667,380 | Parsons | Jan. 26, 1954 |